US012655866B2

(12) United States Patent
Bogenstahl et al.

(10) Patent No.: US 12,655,866 B2
(45) Date of Patent: Jun. 16, 2026

(54) DEVICE FOR PRODUCING A RELEASABLE CLEARANCE-FREE POSITION OF A ROLLING BEARING AND A CORRESPONDING METHOD

(71) Applicant: MATTHEWS INTERNATIONAL CORPORATION, Pittsburgh, PA (US)

(72) Inventors: Frank Bogenstahl, Ahaus (DE);
Carsten Kleingries, Vreden (DE);
Christoph Lansing, Vreden (DE);
Thomas Hackfort, Ahaus-Alstätte (DE)

(73) Assignee: Matthews International Corporation, Pittsburgh, PA (US)

( * ) Notice: Subject to any disclaimer, the term of this patent is extended or adjusted under 35 U.S.C. 154(b) by 27 days.

(21) Appl. No.: 18/283,889

(22) PCT Filed: Feb. 24, 2022

(86) PCT No.: PCT/DE2022/100152
§ 371 (c)(1),
(2) Date: Sep. 25, 2023

(87) PCT Pub. No.: WO2022/199742
PCT Pub. Date: Sep. 29, 2022

(65) Prior Publication Data
US 2024/0159266 A1 May 16, 2024

(30) Foreign Application Priority Data
Mar. 26, 2021 (DE) .................... 10 2021 107 749.4

(51) Int. Cl.
*F16C 13/06* (2006.01)
*F16C 19/52* (2006.01)
(Continued)

(52) U.S. Cl.
CPC ............ *F16C 13/06* (2013.01); *F16C 19/522* (2013.01); *F16C 25/06* (2013.01); *F16C 27/066* (2013.01);
(Continued)

(58) Field of Classification Search
CPC ........ F16C 13/06; F16C 19/522; F16C 27/06; F16C 27/066; F16C 39/04; F16C 41/02;
(Continued)

(56) References Cited

U.S. PATENT DOCUMENTS 5,572,909 A * 11/1996 Chi ........................ F16C 19/386
74/594.1
10,054,159 B2 * 8/2018 Reichert ................. F16C 25/08

FOREIGN PATENT DOCUMENTS

DE          2639320 A1    3/1978
DE     102011080159 B4    4/2013
(Continued)

OTHER PUBLICATIONS

International Search Report (English and German) and Written Opinion of the ISA (German) issued in PCT/DE2022/100152, mailed May 31, 2022; ISA/EP.
(Continued)

*Primary Examiner* — James Pilkington
(74) *Attorney, Agent, or Firm* — Jones Day

(57) ABSTRACT

A device for producing a releasable clearance-free position of a rolling bearing, having a rolling bearing which has an outer ring, an inner ring mounted on a shaft and a plurality of rolling elements arranged between the inner ring and the outer ring, and having a tensioning device mounted on the circumference of the rolling bearing outer ring for generating a radial preload which is uniform over the outer circumference of the rolling bearing outer ring between the tensioning device and the rolling bearing outer ring, wherein (Continued)

Figure 1:
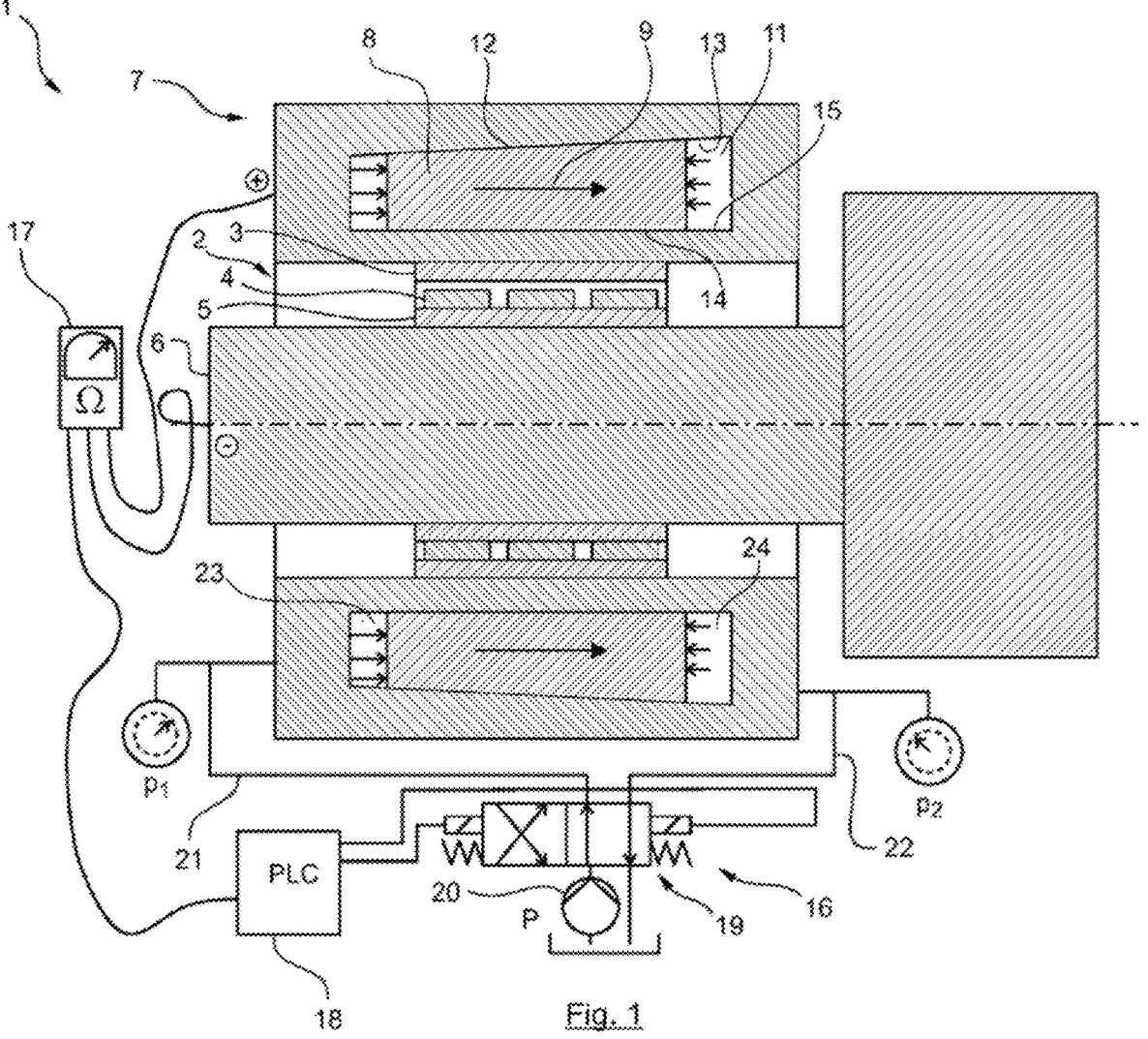

the tensioning device has an axially adjustable tensioning element which can be brought into a first alignment in which the rolling bearing has play, and which can be brought into a second alignment in which the rolling bearing is free of play. A corresponding method is also described.

12 Claims, 2 Drawing Sheets

(51) Int. Cl.
  *F16C 25/06* (2006.01)
  *F16C 27/06* (2006.01)
  *F16C 39/04* (2006.01)

(52) U.S. Cl.
  CPC .......... *F16C 39/04* (2013.01); *F16C 2229/00* (2013.01); *F16C 2233/00* (2013.01); *F16C 2240/14* (2013.01)

(58) Field of Classification Search
  CPC .............. F16C 2226/16; F16C 2229/00; F16C 2240/14; F16C 2322/12
  See application file for complete search history.

(56) References Cited

FOREIGN PATENT DOCUMENTS

| | | | | |
|----|----------------|----|---------|----------------|
| DE | 102014213880 | A1 | 1/2016 | |
| DE | 102018117639 | A1 | 1/2020 | |
| DE | 102018123980 | A1 | 4/2020 | |
| JP | S61-088015 | | 5/1986 | |
| JP | H2-88138 | | 10/1992 | |
| JP | H07-310742 | | 11/1995 | |
| JP | 2008240915 | A * | 10/2008 | ............ F16C 19/364 |

OTHER PUBLICATIONS

Japan Patent Office, Appl. 2023-559750, Decision of Rejection, Jul. 8, 2025.

* cited by examiner

DEVICE FOR PRODUCING A RELEASABLE CLEARANCE-FREE POSITION OF A ROLLING BEARING AND A CORRESPONDING METHOD

CROSS-REFERENCE TO RELATED APPLICATIONS

This application is a U.S. National Phase Application under 35 U.S.C. 371 of International Application No. PCT/DE2022/100152, filed on Feb. 24, 2022, which claims the benefit of German Patent Application No. 10 2021 107 749.4, filed on Mar. 26, 2021. The entire disclosures of the above applications are incorporated herein by reference.

BACKGROUND

This section provides background information related to the present disclosure which is not necessarily prior art.

Technical Field

The present invention is based on a device for producing a releasable clearance-free position of a rolling bearing, with a rolling bearing comprising an outer ring, an inner ring mounted on a shaft, and a plurality of rolling elements arranged between the inner ring and the outer ring, and with a tensioning device mounted on the circumference of the rolling bearing outer ring for generating a radial and uniform preload over the outer circumference of the rolling bearing outer ring between the tensioning device and the rolling bearing outer ring, wherein the tensioning device has an axially adjustable tensioning element which can be brought into a first orientation in which the rolling bearing has play, and which can be brought into a second orientation in which the rolling bearing has no play. Such a preload is known from DE 10 2014 213 880 A1. The invention further relates to a method for adjusting the preload of a rolling bearing mounted on a shaft.

Discussion

A hydraulic clamping bushing is known from DE 10 2018 123 980 A1. However, this is not disclosed in connection with a rolling bearing, but in use with a hub and for producing a frictional connection between an inner shaft and the outer hub. Another clamping bush is known from DE 26 39 320 A1. This is used for the frictional connection of a shaft to a part to be tensioned, such as a sprocket, a V-belt pulley or a toothed pinion. A connection between the clamping bushing and a rolling bearing is not disclosed, in particular not for generating a defined bearing preload. A further device for generating a bearing preload is also known from DE 10 2018 117 639 A1.

The disadvantages of tapered rolling bearings known from the state of the art, such as tapered roller bearings, which are used, for example, in wheel bearings on automobiles, are that the tapered or conical running surfaces can only be installed together as a functional unit in the bearing. This always results in an additional summand when calculating the overall tolerance. With the aid of the present invention, concentricity on the one hand and the adjustment of the rolling bearing clearance on the other hand can actually be carried out separately. On spindles, shafts, rollers, rotors, etc., the present invention can be used to perform final cylindrical machining or calibration of all rotating parts together with the inner ring of the bearing.

The invention therefore has the advantage of enabling a high runout accuracy with simultaneous absorption of high loads. This is also achieved, among other things, by the fact that the bearing preload is generated not only in a two-dimensional preload plane, but completely circumferentially around the bearing outer ring. This allows roller arrangements with backlash-free rotation function in all planes.

A defined preload is generated in the rolling bearings to be preloaded by adjusting the outer diameter of the bearing outer rings. This achieves circular partial or full contact via the rolling elements from the static assembly to the rotating assembly.

In addition, the present invention enables a very compact design. A multiple bearing arrangement with bearings braced against each other, on the other hand, has a significantly larger space requirement and also always leads to a reduction in load absorption, since in the braced arrangement the rolling bearings can only dissipate the loads in the direction of contact with the rotating body.

The present invention also enables operating condition monitoring during operation of the bearing, so that bearing damage or other wear-related failure symptoms can be detected at an early stage. In addition, the bearing preload can be adjusted during operation so that if a change in the bearing preload is detected, for example due to thermal changes, the preload can be continuously readjusted to an optimum value so that, on the one hand, optimum operating conditions, for example in the form of very accurate concentricity, and, on the other hand, bearing wear can be minimized.

SUMMARY

This section provides a general summary of the disclosure and is not a comprehensive disclosure of its full scope or all of its features.

It is one aspect of the present invention to provide a device for producing a clearance-free position and/or for generating a defined preload of a rolling bearing mounted on a shaft, which device is, on the one hand, particularly easy to handle and can be used advantageously in changing operating conditions and, on the other hand, serves to generate a high running accuracy of the rolling bearing.

Accordingly, it is provided that the tensioning device has a cavity which extends axially and at least in sections, preferably over the entire circumference of the tensioning device in an annular manner and tapers in the axial direction, in which the tensioning element is received in the form of a sleeve in an axially displaceable manner.

The device can be used in the area of roll bearings, in roll arrangements such as in a rolling mill or roll forming line, in printing presses, rotary process machines, or in creasing, embossing or punching.

Further areas of application of the present invention can also be spindle bearing arrangements on machine tools for both tool spindles and workpiece spindles, for example in machining systems, in roll hardening or in knurling. It is also conceivable that the invention is used in spindle bearing arrangements of rotators, for example in the turbomachinery sector. It is also conceivable that it could be used in wheel bearings.

In printing technology, to achieve concentricity of the engraved roll, the rolling bearing inner rings are mounted on the roll separately from the rolling element with race. As a result, the surface of the roll with the inner ring of the rolling bearing is produced with maximum concentricity in a single clamping operation during manufacture. Particularly in the case of required smooth roll surfaces for the production of material webs, a tolerance between the race of the rolling bearing and the roll surface that is as "runout-free" as possible is required. With the conical "shrinkage" of the bearing outer ring with a conical clamping set proposed in the present invention, a circularly very accurate infeed is achieved. This is achieved because the individual parts are in direct ground contact and the individual parts can be manufactured very accurately for a given tolerance range circularly by turning and grinding. This is not possible when using tapered bearings, as these consist of separately manufactured rolling elements whose manufacture is subject to greater tolerance fluctuations.

The tensioning device can be designed so that it can be pushed onto the rolling bearing outer ring in the axial direction. The tensioning device can surround the rolling bearing outer ring in an annular manner. The tensioning device can have a width in the axial direction which is greater than the axial width of the rolling bearing. In the first orientation, it may be provided that there is a clearance between the tensioning element and the tensioning device, or at least that there is no distortion condition. In the second orientation, it may be provided that the tensioning element has an oversize relative to the tensioning device and/or there is a state of distortion between the two elements.

It can be provided that the tensioning element is adjustable within the second alignment in such a way that a defined bearing preload can be set. The tensioning element can have an axial width that is greater than the axial width of the rolling bearing. This allows axial adjustment of the tensioning element within the tensioning device without the tensioning element no longer covering the rolling bearing.

In particular, the cavity can taper linearly. The cavity may have an axial width that is larger than that of the tensioning element, so that the tensioning element is axially adjustable within the cavity. It may be provided that the least cavity height is less than the least tensioning element height. It may further be provided that the greatest cavity height is greater than or equal to the greatest tensioning element height. The sleeve may have two opposing end faces. It may be provided that the sleeve is only adjustable or designed in such a way that a respective pressure chamber remains between the respective end face and the cavity wall opposite the latter in each case.

It can also be provided that the sleeve has a sleeve outer surface which is conical in the axial direction at least in sections, and the cavity has a cavity outer surface which is conical in the axial direction at least in sections and points inwards in the radial direction and interacts with the sleeve outer surface, the conical section of the sleeve surface and the conical section of the cavity outer surface being aligned parallel to one another. Accordingly, the sleeve may have a sleeve outer surface that is wedge-shaped in cross-section and the cavity may have a correspondingly shaped cavity outer surface. By axially adjusting the sleeve in the cavity, it is possible on the one hand to achieve a clearance-free position of the rolling bearing and on the other hand to realize a predefined preload that is dependent on the degree of axial adjustment.

In addition, it may be provided that the sleeve has a sleeve inner surface and the cavity has a cavity inner surface abutting the sleeve inner surface and pointing radially outward, wherein the sleeve inner surface and the cavity inner surface are aligned parallel to the axial direction of the rolling bearing. The sleeve inner surface and the cavity inner surface may lie flat against each other. The parallel alignment with respect to the axial direction of the rolling bearing has the advantage that a largely homogeneous stress distribution is produced.

It is conceivable that an actuator is connected to the tensioning device, which is set up for continuous axial adjustment of the tensioning element. For this purpose, the cavity can be designed as a hydraulic chamber and the tensioning element as a piston axially adjustable therein or as a hydraulic actuator. Depending on the height and location of the pressurization, a desired shrinkage of the race of the rolling bearing can be effected. The tensioning device can be driven hydraulically, electrically, pneumatically, mechanically or by means of at least one spindle. Compared with solutions known from the prior art, in which a preload is set once before commissioning, for example by means of set screws, the present invention has the advantage that the preload can be continuously adjusted and can, for example, take into account changing operating conditions.

It may be envisaged that a device for continuous monitoring of the bearing clearance of the rolling bearing is also provided. This can be done, for example, by detecting the preload and/or the contact tolerance by means of electrical contact resistance values. Alternatively or additionally, it can be provided that the monitoring of the bearing clearance is carried out by means of detection of noise characteristics, oscillation changes, vibrations and/or torque changes in the drive.

In particular, the device can have a control loop for setting a pre-definable target bearing preload, whereby in the control loop the target bearing preload is compared continuously or at predefined time intervals with the actual bearing preload measured by the device for continuous monitoring of the bearing clearance, and in response to this the actuating device is controlled with a corresponding manipulated variable. For this purpose, the device can have a control device which receives the measurement data from the monitoring device and transmits a corresponding actuation signal. For this purpose, the device can further comprise an electrically controllable valve by means of which the direction of the pressure to be generated and thus the direction of movement of the tensioning element can be controlled. The device may further comprise a pump by means of which the pressure to be generated can be adjusted. The control device may be connected to the valve for presetting the valve position. The control device can be connected to the pump for presetting the pump pressure to be set.

The device can have, in particular, a cylindrical roller bearing or a needle roller bearing as the rolling bearing. In principle, any type of bearing can be used which can be preloaded perpendicular to the bearing axis.

Rolling bearings with cylindrical rolling elements have the advantage of low running tolerances. In addition, the possibility of calibrating the inner rings on the rolls in one machining step with the roll surface during one clamping operation avoids tolerance summation. In contrast, this possibility of calibrating the rotators together with the inner rings in a single clamping operation does not exist for tapered roller bearings. The running accuracy of tapered roller bearings can only be achieved by eliminating the individual tolerances in a machine tool spindle, for example. Tapered roller bearings are mounted in multiple rows in X and O arrangements. This can be designed for long-term stability but requires an appropriate size.

Furthermore, a method for adjusting the preload of a rolling bearing mounted on a shaft is proposed, comprising:

Detection of the preload of a bearing arrangement while it is in operation;

Comparing the detected actual preload with a target preload and calculating a difference value;

Using the difference value, outputting a manipulated variable to an actuator for setting the bearing preload, the actuator controlling the axially adjustable tensioning element arranged in the tensioning device, which generates a predefined bearing preload depending on the axial adjustment position.

It may be provided that the detection of the preload comprises the measurement of an electrical contact resistance and/or the measurement of mechanical loads and/or the measurement of thermal operating conditions of the bearing. It may alternatively or additionally be provided that the detection of the preload comprises the detection of noise characteristics, oscillation changes, vibrations and/or torque changes in the drive.

It can be provided that the tensioning element is axially adjusted hydraulically or pneumatically by the actuator. Alternatively, the tensioning element can be adjusted electrically or mechanically by means of spindles.

The method may provide that for axial adjustment of the tensioning element is subjected to different pressures at opposite end faces, wherein for increasing the preload a first pressure on a first face of the tensioning element is increased relative to a second pressure on a second face of the tensioning element opposite the first face, and wherein for decreasing the preload the second pressure is increased relative to the first pressure.

In particular, it can be provided that the tensioning element is arranged in an axially adjustable manner in a cavity that tapers in the axial direction, with the tensioning element being adjusted in the direction of the tapered cavity end in order to increase the preload. Further areas of applicability will become apparent from the description provided herein. The description and specific examples in this summary are intended for purposes of illustration only and are not intended to limit the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
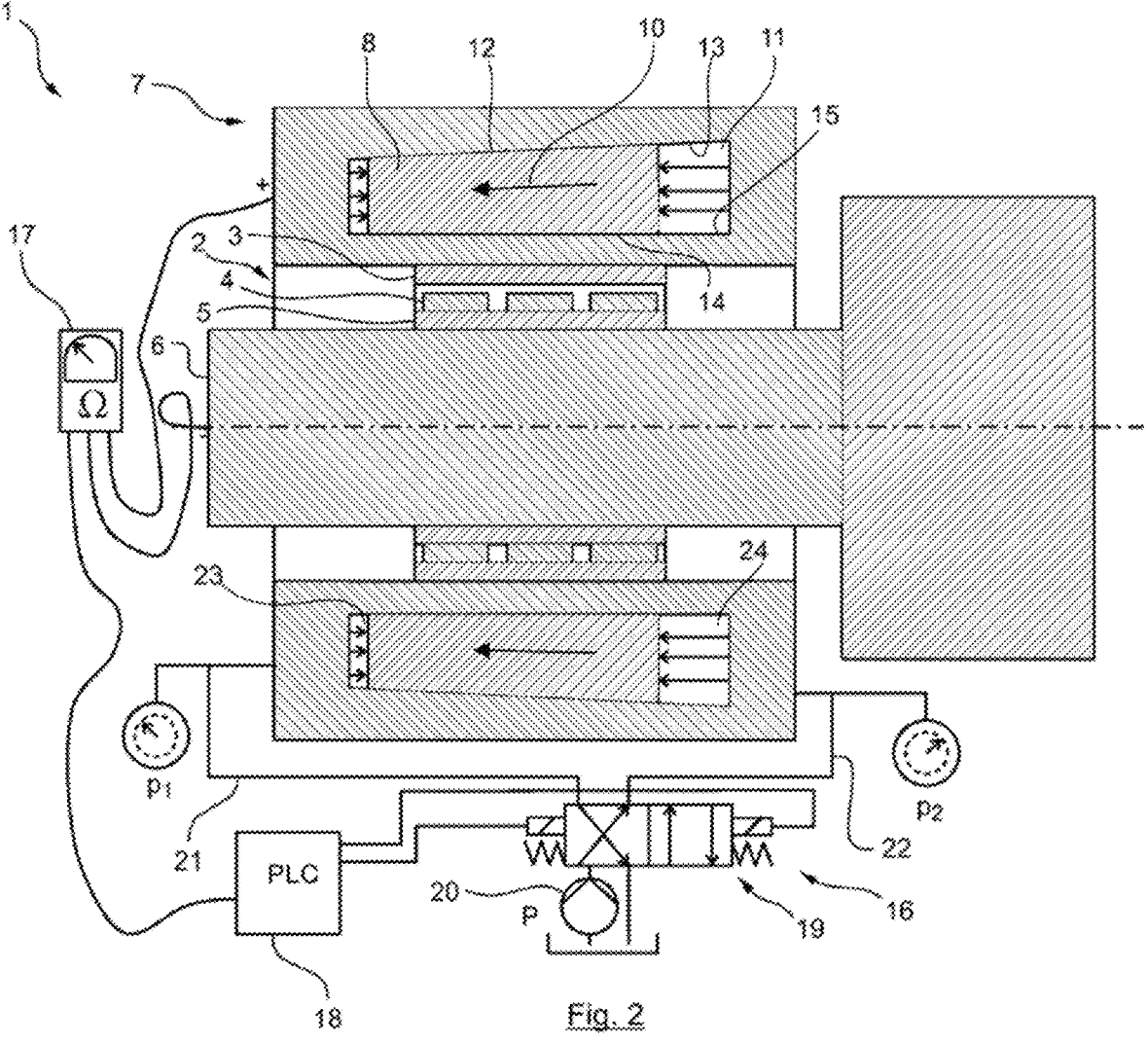

Further details of the invention are explained with reference to the figures below. Thereby shows:

FIG. 1 a cross-sectional view of an embodiment of the device according to the invention in a preload-free first position;

FIG. 2 a cross-sectional view of an embodiment of the device according to the invention in a preload-generating second position.

DETAILED DESCRIPTION

Example embodiments will now be described more fully with reference to the accompanying drawings.

The device 1 shown in FIG. 1 for producing a releasable clearance-free position of a rolling bearing has a rolling bearing 2 mounted on a shaft 6 in the form of a needle bearing with a bearing inner ring 5, rolling elements 4 and a bearing outer ring 3. A tensioning device 7 for generating a radial circumferential stress is pushed axially onto the bearing outer ring 3 and has an annular cavity 11 with a tensioning element 8 axially adjustable therein. The cavity 11 has a radially outwardly facing cavity inner surface 15, which is aligned parallel to the bearing axis. The cavity 11 further has an inwardly facing cavity outer surface 13, which does not run parallel to the cavity inner surface 15, but runs at an angle as shown, so that the cavity 11 tapers from right to left or has a lower height on the left than on the right in the illustration. The tensioning element 8 has contact surfaces corresponding to the cavity shape, with a radially inwardly facing tensioning element inner surface 14 and an outwardly facing tensioning element outer surface 12. The tensioning element inner surface 14, like the cavity inner surface 15, is aligned parallel to the bearing axis, and the tensioning element outer surface 12, like the cavity outer surface 13, extends obliquely thereto. Here, the angle of the conical course of the tensioning element outer surface 12 corresponds to the angle of the cavity outer surface 13, relative to the bearing axis. The tensioning element 8 has an axial width that is smaller than the axial width of the cavity 11, so that the tensioning element 8 is axially adjustable in the cavity 11. To generate a preload, it is crucial that the smallest height of the cavity 11 is smaller than the smallest height of the tensioning element 8. On the left and right of the tensioning element 8, the latter has end faces aligned essentially perpendicular to the bearing axis, which each delimit a fluid-tight chamber between themselves and the respective opposite wall of the cavity 11. Thus, the tensioning element 8 forms a hydraulically axially adjustable actuator which causes a predefined shrinkage of the bearing outer diameter depending on the axial position. For this purpose, a first fluid line 21 opens into a first fluid-tight chamber 23 and a second fluid line 22 opens into a second opposite fluid-tight chamber 24, via which the chambers can each be pressurized with a specific hydraulic pressure $p_1$, $p_2$. The two fluid lines 21 and 22 can be controlled via an electrically controllable 4/2-way valve, so that either the first fluid line 21 or the second fluid line 22 is pressurized depending on the valve position. A pump 20 is connected to the valve 19 for generating a desired pressure. The valve 19 or the pump 20 are controlled by a control unit (PLC—Programmable Logic Controller) 18, which receives measurement data continuously or at predetermined intervals from a monitoring device for detecting the bearing clearance or a resistance measuring device 17, which measures the electrical contact resistance measured between the shaft 6 and the tensioning device 7. In the illustration, the negative pole is connected to the shaft and the positive pole of the resistance measuring device 17 is connected to the tensioning device 7. The pump 20, the valve 19, the control device 18 and the resistance measuring device are part of a control device 16, by means of which a control loop for setting a predetermined target preload is implemented.

FIG. 1 shows the tensioning element 8 in a first orientation 9, in which the tensioning element 8 is positioned in such a way that no pretension is generated in the cavity 11. The arrows on the tensioning element 8 indicate its direction of movement to the right, i.e. in the direction of the expanded cavity section. Accordingly, the rolling bearing 2 has bearing play. As can be seen in FIG. 1, there is a clearance between the rolling elements 4 and the outer bearing ring 3. For this purpose, the valve 19 has a position in which the pump 20 applies a signal pressure $p_1$ to the fluid-tight chamber 23 via the first fluid line 21 to lower the preload. FIG. 2 shows the tensioning element 8 in a second orientation 10, in which the tensioning element 8 is positioned in such a way that a preload is generated in the cavity 11, by means of which the bearing 2 is set free of play. The direction of movement, indicated by the arrows on the tensioning element 8, shows that the tensioning element moves to the left, that is, in the direction of the tapered cavity section. In the course of this, the chamber volume of the first fluid-tight chamber 23 decreases and the chamber volume of the second fluid-tight chamber 24 increases. For this purpose, the valve 19 is adjusted by the control unit 18 in such a way that now the second fluid line 22 is pressurized with a pressure $p_2$ for increasing the pretension in the second fluid-tight chamber 24 by the pump 20. As a result, the tensioning device 7 produces a shrinkage on the bearing outer ring 3 so that it is in full contact with the rolling elements 3. Beyond the clearance release, a predefined preload can now be generated in the bearing 2, which is necessary for the particular application. By continuously monitoring the electrical contact resistance and processing the measurement data in the control unit 18, it is possible for the preload to be readjusted continuously and during operation, for example if a change in preload occurs in the event of thermal fluctuations.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for adjusting a clearance of a rolling bearing, comprising:

a roller bearing having an outer ring, an inner ring mounted on a shaft, and a plurality of rolling elements arranged between the inner ring and the outer ring, and with a tensioning device mounted on the circumference of the rolling bearing outer ring for generating a radial and uniform preload over the outer circumference of the rolling bearing outer ring, wherein the tensioning device has an axially adjustable tensioning element which can be brought into a first alignment in which the rolling bearing has clearance between the outer ring and the rolling elements, and which can be brought into a second alignment in which the rolling bearing is free of clearance between the outer ring and the rolling elements, wherein the tensioning device has a closed cavity which extends axially over the entire circumference of the tensioning device in an annular manner and tapers in the axial direction, in which cavity the tensioning element is received in the form of a sleeve in an axially displaceable manner.

2. The device according to claim 1, wherein the sleeve has a sleeve outer surface extending conically at least in sections in the axial direction and the cavity has a cavity outer surface extending conically at least in sections in the axial direction and pointing inwardly in the radial direction and cooperating with the sleeve outer surface, wherein the conical section of the sleeve outer surface and the conical section of the cavity outer surface are aligned parallel to one another.

3. The device of claim 2, wherein the sleeve has a sleeve inner surface and the cavity has a cavity inner surface abutting the sleeve inner surface and facing radially outward, wherein the sleeve inner surface and the cavity inner surface are aligned parallel to the axial direction of the rolling bearing.

4. The device according to claim 1, further comprising an actuator connected to the tensioning device, which is configured for continuous axial adjustment of the tensioning element.

5. The device according to claim 4, which further comprises a resistance measuring device configured for continuously monitoring the bearing clearance of the rolling bearing by measuring electrical contact resistance between the shaft and the tensioning device, wherein a change in the measured electrical contact resistance corresponds to a change in the bearing clearance.

6. The device according to claim 5, which further comprises a control device configured for implementing a control loop for setting a predefinable desired bearing preload, wherein in the control loop the desired bearing preload is compared continuously or at predefined time intervals with the actual bearing preload determined based on the bearing clearance measured by the resistance measuring device and in response thereto the actuator is actuated with a corresponding manipulated variable.

7. The device according to claim 1, wherein the roller bearing is a cylindrical roller bearing or a needle roller bearing.

8. A method for adjusting a preload of a rolling bearing mounted on a shaft by means of a device according to claim 1, comprising the steps:

detecting the preload of the roller bearing while it is in operation;

comparing the detected preload with a target preload and calculating a difference value;

using the difference value, outputting a manipulated variable to an actuator for adjusting the bearing preload, wherein the actuator controls the axially adjustable tensioning element arranged in the tensioning device, which, depending on the axial adjustment position, generates a predefined bearing preload.

9. The method of claim 8, wherein said detecting of the preload comprises measuring an electrical contact resistance and/or measuring mechanical loads and/or measuring thermal operating conditions of the bearing.

10. The method according to claim 8, wherein the tensioning element is axially adjusted hydraulically or pneumatically by the actuator.

11. The method according to claim 10, wherein, for axial adjustment, the tensioning element is subjected to different pressures at opposite end faces, wherein, for increasing the pretension, a first pressure on a first face of the tensioning element is increased relative to a second pressure on a second face of the tensioning element opposite the first face, and wherein, for decreasing the pretension, the second pressure is increased relative to the first pressure.

12. The method of claim 11, wherein the closed cavity has a first axial end with a first radial height and a second axial end with a second radial height, wherein the first radial height is shorter than the second radial height, and wherein the tensioning element is adjusted axially in the direction of the first axial end to increase the preload.

*　*　*　*　*